April 1, 1969   G. O. SHERMAN, JR   3,436,027
WASTE DISPOSER
Filed July 13, 1965   Sheet 1 of 2

INVENTOR.
George O. Sherman, Jr.
BY
Hovey, Schmidt, Johnson & Hovey
ATTORNEYS

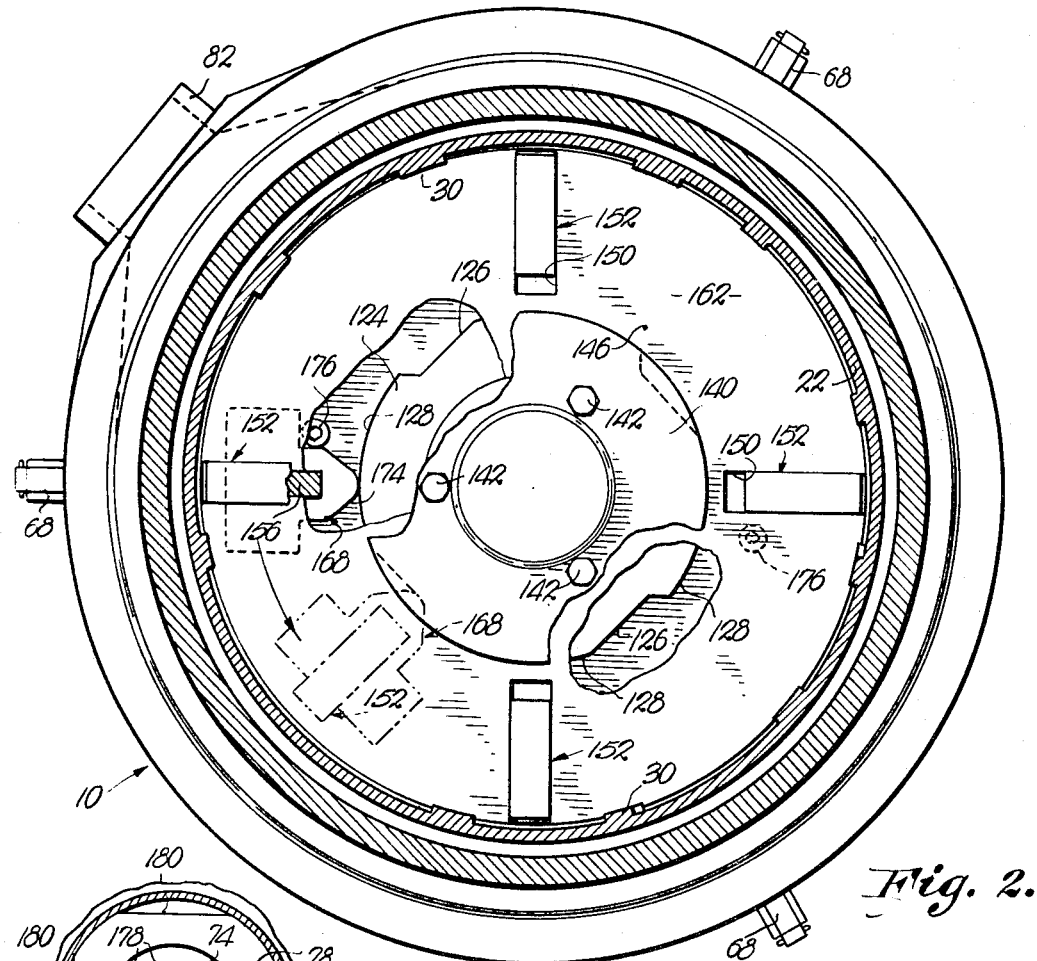

United States Patent Office 3,436,027
Patented Apr. 1, 1969

3,436,027
WASTE DISPOSER
George O. Sherman, Jr., Prairie Village, Kans., assignor to The Salvajor Company, Kansas City, Mo., a corporation of Missouri
Filed July 13, 1965, Ser. No. 471,769
Int. Cl. B02c 18/42, 18/12
U.S. Cl. 241—46.08
17 Claims

ABSTRACT OF THE DISCLOSURE

A waste disposer having a bi-directional motor and a rotor with lugs that move away from the shredding surface upon a reversal of direction of rotation. The lugs again return to an operative position upon continued rotation of the rotor. The motor and rotor are provided with "quick-disconnect" fastenings to the housing to permit removal from the housing without need to disconnect any plumbing whatsoever. The motor casing is constructed to utilize the flow of water in the disposer to dissipate the heat from the motor.

---

This invention relates to improvement in waste disposal or garbage grinding equipment and has as its primary object the provision of a waste disposer which not only effectively utilizes substantially all of the power supplied to it and may be readily installed in or removed from its operating position aligned with a waste discharge opening, but also may be quickly unjammed and returned to its normal operating condition by merely reversing the movement of its rotor to thereby provide a more efficient unit than those heretofore disclosed.

A common problem with all waste disposer units is the jamming thereof when an object, such as silverware, glass or plastic, becomes wedged between their stationary and movable parts. Generally, such units have a rotor provided with one or more upwardly extending projections or lugs which cooperate with a shredder ring to shred and thereby reduce the waste as the rotor rotates. When an object becomes lodged between the shredder ring and one of the lugs, the operation of the disposer unit is stopped and steps must be taken to unjam the unit before operation can be resumed.

Various attempts have been made to improve the rotor structure of a disposer unit of this type so as to minimize the shutdown time required during an unjamming operation. These have been generally unsatisfactory because the design of these rotor improvements has not solved the problem of effectively relieving the wedging action of a solid object which, when positioned between the shredder ring and a lug, causes the unit to jam. Usually, it is necessary to manually remove the jamming object since the rotor operates effectively in only one direction and the object will jam the rotor again if it is not physically removed from the region between the shredder ring and the path of travel of the lugs. In extreme cases, the disposer unit itself must be removed from its operative location and disassembled in order to gain access to the jamming object for removing the same from the unit.

The present invention overcomes the aforesaid difficulties arising due to the jamming of a waste disposer by providing improved waste reducing means cooperable with a shredder ring and a rotor capable of being rotated at operating speeds in either of a pair of opposed directions, wherein the disposer is unjammed by merely reversing its direction of rotation. In this way, the wedging action on one of the rotor lugs due to a solid object between the lug and the adjacent shredder ring is relieved and is incapable of again being established inasmuch as the dispositions of the object, ring and lug are substantially changed so as to be no longer critical for jamming. Thus, the rotor is capable of operation regardless of its direction of rotating; whereby the reversing of its direction of rotation not only unjams the disposer but also returns the rotor once again to its operating condition.

The aforesaid results are obtained by virtue of the design and construction of the rotor and a number of waste shredding lugs shiftably mounted thereon, the lugs being movable toward and away from the shredder ring as a function of the arcuate displacement of the rotor and are rotatable with respect to the latter, at least to a certain degree, so that, when one of the lugs is jammed, the rotor may be rotated relative to the jammed lug until a condition is reached at which this lug is free to move away from the shredder ring and does so move under the influence of the biasing action of the wedging force. Such movement of the jammed lug relieves this wedging force and continued rotation of the rotor in the opposite direction subsequently causes the lugs to rotate therewith in this last mentioned direction. Hence, the wedging action of the jamming object is prevented from again being established under the same conditions and the disposer is automatically returned to operation. These steps are repeated if jamming occurs again while the rotor is rotating in this opposite direction.

Several additional features of the instant waste disposer provides for highly efficient utilization thereof during normal operation. One of these features is the provision of means which not only permits the disposer housing to be quickly and easily secured in place in an operative location below and in alignment with a waste discharge opening, but also permits rapid assembly and disassembly of the power structure thereof including the rotor and lugs when the disposer housing is secured below the aforesaid opening. Thus, the disposer need not be completely removed from its operative location when it is necessary or desirable to inspect, repair or replace the power source, the rotor or the lugs.

Anther important feature of this disposer is the provision of a motor casing thereof which not only mounts the drive motor of the disposer on the housing but also cooperates with the latter to define a waste-receiving passage in thermal interchange relationship with the motor. Waste comminuted by the action of the shredder ring and lugs and liquefied by water or other liquid which is at a lower temperature than the motor during its operation, will serve to cool the motor. In this way, the motor may operate at peak efficiency and need not be limited in the manner in which motors of conventional disposer units are so limited.

A further important feature of the present disposer is the provision of a waste discharge outlet therefor in fluid communication with the above mentioned waste-receiving passage, the outlet being constructed to direct waste outwardly of the disposer housing regardless of the direction of rotation of the rotor and without impairing the cooling effects obtained by the use of the aforesaid motor casing. The efficiency of the disposer is thereby enhanced inasmuch as two separate discharge outlets are unnecessary.

It is therefore another object of this invention to provide a waste disposer of the type described which utilizes waste shredding lugs operably coupled in an improved manner to a rotor for movement toward and away from a shredder ring as well as for rotation with respect to the rotor, whereby the latter may be rotated in one direction relative to the lugs when one of such lugs becomes jammed after being rotated by the rotor in the opposite direction to thereby align the jammed lug with a recess on the rotor permitting this lug to free itself from the wedging action of the jamming object.

A further object of this invention is the provision of a waste disposer of the aforesaid character whose rotor automatically returns to operating speeds when it is reversed to relieve the jamming action caused by the wedging of an object between the adjacent shredder ring and one of the lugs associated therewith.

A further object of the present invention is the provision of a waste disposer of the type described which includes quick release means coupling the power structure thereof to the disposer housing so that ready access to the motor or the rotor may be had for inspection, repair or replacement when such becomes necessary or desirable.

Still a further object of this invention is the provision of a waste disposer whose external housing may be readily secured in place in alignment with a waste discharge opening whereby the installation of the disposer does not require special skills and can be accomplished in a minimum of time.

A further object of this invention is the provision of a waste disposer which has a waste discharge or receiving passage in thermal interchange relationship with the power source thereof, whereby the power source may be continuously cooled during operation of the disposer and may be operated at peak efficiency at all times.

Yet a further object of the instant invention is the provision of a waste discharge outlet for a waste disposer of the type described which is designed and constructed to permit the discharge of waste from the unit regardless of the direction of rotation of its rotor so that the desirable results attained by the reversing of the rotor and the cooling of the power source may be utilized to thereby provide a more efficient unit than has heretofore been disclosed.

In the drawings:

FIG. 2 is a cross-sectional view taken along line 2—2 of FIG. 1;

FIG. 3 is a perspective view of one portion of the slotted plate which mounts the waste shredding lugs on the rotor;

FIG. 4 is a perspective view of one of the lugs separated from its retainer for mounting the same on the plate to FIG. 3;

FIG. 5 is a view similar to FIG. 4 but showing the lug coupled with the retainer;

FIG. 8 is a fragmentary plan view of the disposer motor showing the perforated armature and the flattened sides thereof.

Figure 1:
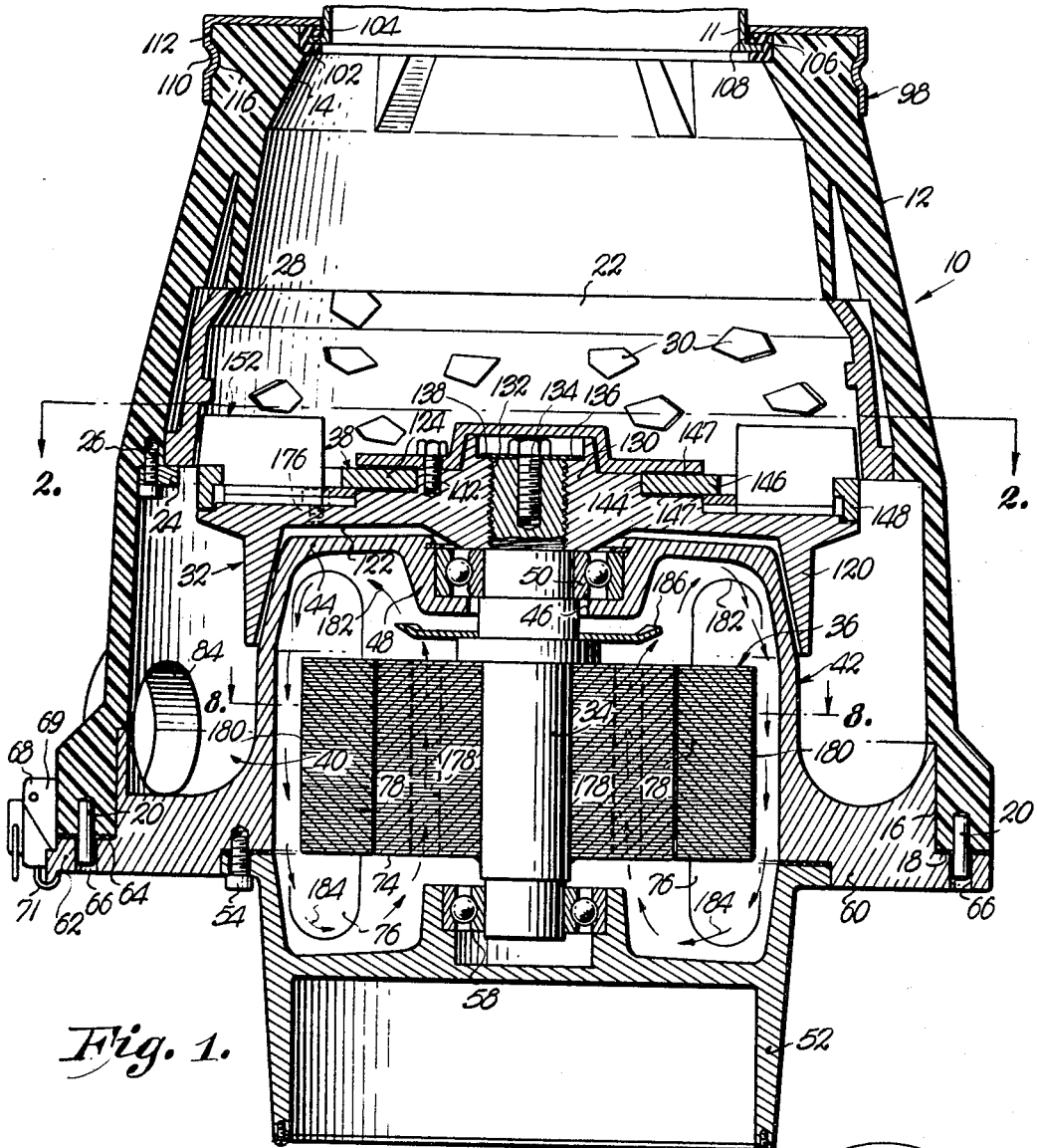
FIGURE 1 is a vertical section through the waste disposer.

Waste disposer 10 is adapted to be coupled to a waste discharge conduit 11 below a sink or similar unit and to be coupled to a sewer pipe, whereby garbage and other refuse comminuted or reduced in disposer 10 may be forced into the sewer pipe by flushing the waste products through the disposer with a flow of water entering disposer 10 from above. Disposer 10 includes a tubular housing 12 provided with an open top 14 and an open bottom 16 and, as illustrated, is transversely circular throughout its length. This transverse configuration is not necessary to carry out the invention, however, and is not to be construed as limiting the invention. As shown in FIG. 1, housing 12 flares outwardly as bottom 16 thereof is approached and terminates in an end face 18 having a number of guide pins 20 projecting downwardly therefrom for a purpose hereinafter described. Housing 12 is preferably formed from a moldable, relatively rigid material which is strong enough to support and retain therein certain components of disposer 10 yet to be described.

An annular shredder ring 22 is within housing 12 intermediate top 14 and bottom 16 thereof releasably secured by a bracket 24 connected to housing 12 by screw means 26. Ring 22 is held against a shoulder 28 forming a part of housing 12 and thereby maintained in an operative disposition substantially concentric to the longitudinal axis of housing 12. Ring 22 is provided with a number of spaced shredding projections 30 in the inner surface thereof.

A rotor 32, normally positioned within housing 12 in substantially axial alignment with ring 22, has reducing means 38 thereon which cooperates with ring 22 to shred and thereby reduce waste material directed into housing 12 through open top 14 as rotor 32 rotates. Rotor 32 and reducing means 38 are spaced from ring 22 and are rotatable with respect thereto in opposite directions by virtue of being coupled to a rotatable shaft 34 forming a part of a reversible, electric motor 36. Water or a similar liquid directed into housing 12 through open top 14 flushes the comminuted or pulverized waste through the space between ring 22 and reducing means 38, whereby the liquefied waste passes into an annular waste receptacle or waste-receiving passage 40 in surrounding relationship to motor 36.

A casing 42 for motor 36 is removably coupled with and extends into housing 12 through bottom 16 thereof as shown in FIG. 1 and has an upper wall 44 provided with a central opening 46 through which shaft 34 passes, opening 46 being below a bearing mount 48 having a roller bearing 50 which supports the upper end of shaft 34. A tubular extension 52 is secured by screw means 54 to the lower face of casing 42 and is provided with a bearing mount 56 which supports a roller bearing 58 in vertical alignment with bearing 50. Bearing 58 journals the lower end of shaft 34 so that the latter is substantially coincident with the central axis of housing 12.

Casing 42 is provided with an annular flange 60 projecting laterally therefrom adjacent the lower face thereof and spanning the distance between housing 12 and casing 42 as shown in FIG. 1. Thus, housing 12, casing 42 and flange 60 define passage 40 whose depth extends substantially between rotor 32 and flange 60.

Flange 60 has an annular extension 62 which normally underlies end face 18 of housing 12. A sealing gasket 64 is disposed between end face 18 and extension 62 to seal the junction therebetween. Extension 62 is provided with a bore 66 for each guide pin 20 respectively, guide pins 20 being movable into respective bores 66 for properly aligning casing 42 as the latter is coupled to housing 12.

A plurality of quick release fasteners 68 are carried by housing 12 adjacent bottom 16 and releasably interconnect extension 62 and thereby casing 42 to housing 12. As shown in FIG. 2, three such fasteners 68 are provided at predetermined locations on the lower periphery of housing 12. Each fastener 68 may be of any suitable construction and, as illustrated, includes a base member 69 secured to housing 12 and a second member below extension 62 and movable toward and away from member 69 for urging extension 62 against gasket 64. Flange 60 has a rib 70 which engages a shoulder 72 on housing 12 for alignment purposes and to provide a smooth junction between housing 12 and casing 42.

Motor 36 includes an armature 74 coupled with shaft 34 and being rotatable therewith relative to casing 42. Armature 74 is disposed within a region between a pair of field coils 76 to which respective cores 78 of laminated sheets of magnetically permeable material are coupled. The electrical current passing through coils 76 for effecting the rotation of armature 78 generates heat depending upon the magnitude of the current and the value of the electrical resistance of the material in coil 76.

To dissipate this heat and to render motor 36 more efficient by preventing an increase in the electrical resistance of coils 76, cores 78 are placed in thermal interchange relationship with casing 42 and, in this respect, cores 78 are in actual contact with an upright, annular portion 180 of casing 42 as shown in FIG. 1. Thus, the liquefied waste in passage 40 will contact portion 180 and will thereby be placed in heat exchange relationship with cores 78 to absorb the heat therein generated by electrical current flow through coils 76. Casing 42 should be formed from a material having a relatively low magnetic permeability so that coils 76 will not be magnetically coupled.

Figure 6:
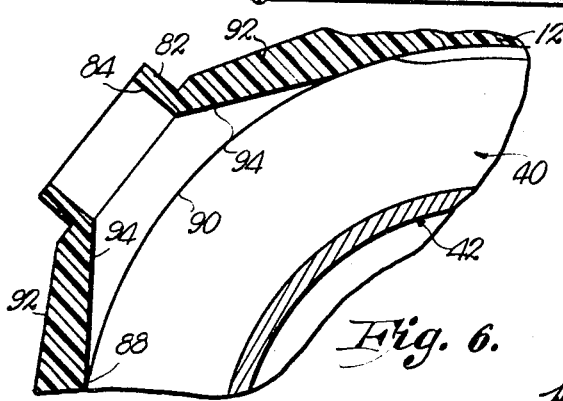
FIG. 6 is a fragmentary, horizontal section of the disposer showing the waste discharge outlet thereof.

Conduit structure 82 (FIG. 6), extending laterally from housing 12 adjacent to and spaced above bottom 16, defines a discharge outlet 84 therefor in communication with passage 40. A sewer pipe or similar structure is adapted to be connected to structure 82. The inner surface 86 of housing 12 above bottom 16 terminates at a pair of spaced extremities 88 and structure 82 is disposed outwardly of the imaginary arcuate line 90 coextensive with inner surface 86 between extremities 88. A pair of elongated stretches 92 interconnect respective extremities 88 with structure 82, each stretch having a surface 94 which is substantially tangential to surface 86 adjacent the respective extremities 88 and extends outwardly from and is angularly disposed relative to line 90. Thus, surfaces 94 will direct waste in liquid form outwardly of passage 40 and through outlet 84 regardless of the direction through passage 40 in which the waste is flowing. The liquefied waste will traverse a circular path through passage 40 under the influence of the rotation of rotor 32 and will tend to flow along surface 86 by virtue of the centrifugal force thereon. As it commenses to move along one or the other of surfaces 94, the waste will be directed toward and into outlet 84.

Figure 7:
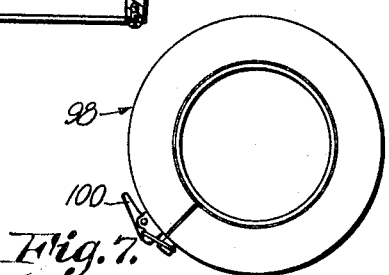
FIG. 7 is a top plan view of the split ring assembly for securing the disposer housing to the lower end of a waste discharge conduit.

Housing 12 is releasably secured to the lower end of conduit 11 by quick release structure in the nature of a split ring 98 having a quick release fastener 100 thereon as shown in FIG. 7. Conduit 11 has an annular, laterally extending flange 102 at the lower end thereof, there being an annular, resilient ring 104 on flange 102 as shown in FIG. 1. Ring 98 has a lower face 106 which overlies the upper surface 108 of ring 104. Ring 98 also has an arcuate, inwardly extending rib 110 on a downwardly extending flange 112 thereof integral therewith at the outer periphery thereof, flange 112 being split at the same location as ring 98. Rib 110 is complementally received within an arcuate recess 116 in the outer surface of housing 12 adjacent 14 whereby housing 12 and all of the components carried thereby are suspended from flange 102 and ring 104 when 98 is in the disposition thereof shown in FIGS. 1 and 7.

Rotor 32 has a main body 118 provided with an annular skirt 120 which surrounds and is in close proximity to the upper portion of casing 42, as shown in FIG. 1, when casing 42 is connected by fasteners 68 to housing 12. Body 118 and skirt 120 are spaced from casing 42 to define an air chamber 122 above the lowermost edge of skirt 120. Also, the upper portion of casing 42 below wall 44 is tapered and is substantially complemental to the inner surface of skirt 120 as shown in FIG. 1. Chamber 122 provides an air seal for protecting against the flow of liquid waste into bearing 50 and downwardly therefrom along shaft 34 into motor 36. Such an air seal is set forth in my disclosure entitled "Garbage Grinder" now U.S. Patent No. 3,017,125 issued Jan. 16, 1962 from application Ser. No. 825,195. This patent is incorporated herein by reference for a detailed description of the air seal defined by chamber 122.

Body 118 is provided with a disc 124 integral therewith on the upper face thereof, as shown in FIGS. 1 and 2. Disc 124 has an outer peripheral surface provided with a number of recesses 126 therein which are equally spaced apart and define surface segments 128 between each pair of adjacent recesses 126 respectively.

Body 118 has a central boss 130 provided with an internally threaded bore 132 which threadably receives the upper end of shaft 34. A bolt 134 is threaded into the end of shaft 34 and retains a washer 136 in place against an annular shoulder 138 on boss 130, whereby body 118 is releasably secured to shaft 34. A disc-like cap 140 is coupled by screws 142 to boss 130 and defines with disc 124 an annular space 144 for shiftably receiving a plate 146, whereby plate 146 is rotatable with respect to body 118. Two layers of frictionable material, such as Teflon-coated rings, are provided between the opposed faces of plate 146 and disc 124 and cap 140 respectively. Plate 146 has an annular flange 148 aligned with the outer periphery of body 118, as shown in FIG. 1, and further is provided with a number of radial slots 150, as shown in FIG. 3, for mounting a number of projections 152 on rotor 32, projections 152 forming parts of reducing means 38. Plate 146 has a central opening 154 in surrounding relationship to boss 130 and for purposes of illustration, has four slots 150 each adapted to receive and mount a respective projection 152, there being a projection 152 for each recess 126 and surface segment 128 respectively.

Each projection 152 includes a lug 156 having a pair of opposed, substantially flat faces 158 which extend longitudinally of the respective slot 150 and a pair of generally upright end edges 150 at the radially outermost extremity of lug 156.

Each lug 156 extends through a corresponding slot 150 and projects upwardly from the upper face 162 of plate 146 as shown in FIG. 1. A notch 164 formed in the outer extremity of each lug 156 defines a surface engageable with plate 146 adjacent the outer end of the corresponding slot 150 to limit the outward travel of lug 156 with respect to the outer periphery of plate 146. In this position, end edges 160 of lug 156 are in shredding relationship to ring 22.

Each lug 156 is provided with a pair of longitudinally extending, side grooves 166 therein adjacent to the lower extremity thereof as shown in FIGS. 4 and 5. A retainer 168 is provided for each lug 156 respectively, each retainer 168 being substantially U-shaped and defining a pair of sides 170 which are spaced apart a distance equal to the distance between grooves 166 and being of substantially the same thickness as the latter. Thus, sides 170 may be received within grooves 166 in the manner shown in FIG. 5. Wings 172 on sides 170 normally project laterally from lug 156 and are in substantial juxtaposition to the lower face of plate 146. Since retainers 168 are also in juxtaposition to the upper position of body 118, lugs 156 will thus be releasably coupled to rotor 32.

Retainers 168 move with lugs 156 as the latter move within respective slots 150. Each retainer 168 is provided with a substantially convex outer edge 174 which normally engages a respective segment 128 for holding the corresponding lug 156 in its waste shredding disposition with respect to ring 122. However, when disc 124 rotates relative to plate 146, a respective recess 126 may move into alignment with the corresponding edge 174 so that lug 156 may move radially inwardly and away from ring 22. This will occur, for instance, when an object is wedged between the corresponding lug 156 and ring 22 in a manner hereinafter described.

A pair of spaced, upwardly extending projections 176 carried by body 118 are engageable with a pair of retainers 168, whereby plate 146 is caused to rotate with body 118 as shaft 34 is rotated by motor 36. Each projection 176 may be of any construction, but, for purposes of illustration, comprises a screw threadably coupled to body 118.

*Operation*

Disposer 10 is initially mounted in place in the manner shown in FIG. 1. To accomplish this, housing 12 is first coupled with flange 102 by ring 98 prior to the interconnection of casing 42 therewith. In the alternative, casing 42 is initially connected to housing 12 through fastener 68 and then housing 12 is coupled by ring 98 to flange 102. In either case, rotor 32 is disposed to position projections 152 in waste shredding relationship to ring 22. Also, structure 82 is coupled to a suitable discharge line, such as a sewer pipe and motor 36 is coupled to a suitable source of electric power by electrical leads (not shown).

When waste, such as table scraps or the like, is directed through conduit 11, it will be deposited on plate 146 and, as rotor 32 is rotated, the waste will be reduced or comminuted by the shredding action caused by one of the end edges 160 of each lug and ring 22. A flow of water into housing 12 through top 14 will flush the comminuted waste into passage 40 and outwardly thereof through outlet 84.

As rotor 32 commences to rotate upon energizing motor 36, projections 176 will move into engagement with adjacent retainers 168 to in turn cause plate 146 and thereby projections 152 to commence to rotate with body 118. Prior to this, plate 146 is stationary inasmuch as the latter is rotatable relative to body 118. Disc 124 rotates relative to plate 146 as rotor 132 commences to rotate. Projections 176 engage retainers 168 when edges 174 engage respective segments 128 of discs 124. Thus, lugs 156 are in their operative positions when plate 146 commences to rotate.

Lugs 156 will be held adjacent the outer extremities of respective slots 150 by segments 128. The leading end edges 160 of lugs 156 will be in waste shredding relationship to the inner surface of ring 22. Waste will be continuously shredded and thereby reduced and the water flowing into housing 12 will carry the comminuted or reduced waste through the space between ring 22 and plate 146 and into passage 40. By virtue of the rotation of rotor 32, the waste flowing into passage 40 and through the latter will follow an arcuate path and will be maintained adjacent the inner surface of housing 12 by centrifugal force. Regardless of the direction of rotation of rotor 32, the corresponding surface 94 will direct the fluid waste into outlet 84 and thereby into the sewer line coupled therewith.

When an object, such as silverware, glass or plastic, becomes wedged between ring 22 and one of the lugs 156, the wedging action will bring rotor 32 to a halt. Since edges 174 are in engagement with segments 128, lugs 156 will be substantially maintained in their operative dispositions when one of the lugs is jammed. Reversing of motor 36 will rotate disc 124 in the opposite direction until the adjacent recess 126 becomes aligned with the retainer 168 corresponding to the jammed lug 156. Thus, edge 174 of the last-mentioned retainer 168 will move off the corresponding segment 128 and will be aligned with the adjacent recess 126. The biasing action of the wedging force will cause the jammed lug to move into this recess. This relieves the wedging force and the jamming object will thus gravitate to the upper face 162 of plate 146. Projections 176 will, shortly thereafter, engage the other pair of retainers 168 to commence rotating plate 146 and thereby projections 152 in the opposite direction. As shown in FIG. 2, one of the retainers 168 is shown extending into one of the recesses 126 to indicate the space between the corresponding lug 156 and the inner surface of ring 22.

As disc 124 commences to rotate in the opposite direction, the retainer in recess 126 will rotate therewith due to the lateral force applied thereto by disc 124. However, centrifugal force will urge retainer 168 and its corresponding lug 156 outwardly so that the corresponding end edge 174 will become aligned with the corresponding surface segment 128. Thus, when projections 176 again engage respective retainers 168, end edges 174 of all retainers 168 will again be in engagement with segments 128 so that lugs 156 will be held in their operative dispositions with respect to ring 22 as rotor 32 continues to rotate at operating speed.

Again, if jamming of one of the lugs occurs, the process is repeated, i.e., the motor is reversed so that the jammed lug may move inwardly of ring 22 when the corresponding retainer becomes aligned with a recess 126. Thereafter, continued movement of rotor 32 in the opposite direction will again bring disposer 10 to operating conditions without requiring the removal of the jamming object from the interior of housing 12. In this way, disposer 10 is operated and unjammed by merely operating an electrical switch controlling motor 36. To unjam the disposer, motor 36 need only be reversed and rotor 32 automatcially unjams the jammed lug. If desired, the jammed object may be removed from housing 12 manually after disposer 10 has been unjammed. Manifestly, rotor 32 is at rest when this is done.

The liquefied waste flowing into passage 40 will be in heat exchange relationship to casing 42 so that core 78 of motor 36 will be cooled during operation of disposer 10. By means of this structure, the increase in resistance of coils 76 due to temperature will be minimal and, for a given voltage rating of motor 36, the electrical current flowing through coils 76 will be at a maximum. This will assure that the optimum horsepower output is attained from motor 36 so that, in this way, disposer 10 is highly efficient.

The quick release feature at the bottom and top of housing 12 permits quick installation and removal of disposer 10 or any part thereof when necessary. For instance, if it is desired to replace lugs 156, fasteners 68 may be manipulated to separate casing 142 from housing 12 in a minimum of time. Not only is casing 142 exposed in this manner, but also all components of rotor 32 and reducing means 38 are accessible. In addition, ring 22 may be replaced if desired when casing 42 is separated from housing 12. The provisions of the quick release fasteners at the top and bottom of disposer 10 renders the same easily handled by unskilled workmen and minimizes the time and effort required to place the same in operation.

To minimize condensation on the inner wall of casing 42 and in the vicinity of motor 36, armature 74 is provided with a number of bores 178 therethrough extending longitudinally of shaft 34 as shown in FIG. 1. Also, cores 78 are provided with flattened sides 180 as shown in FIG. 8 whereby air above motor 36 and below wall 44 may circulate as shown by arrows 182 and 184. To effect this circulation, a fan blade 186 is secured to shaft 34 for rotation therewith.

Casing 42 is preferably formed from a material having a relatively high heat conductance, such as aluminum or the like, so that there will be a minimum of condensation, if any, adjacent to motor 36. The flat sides 180 define air passages extending from the region above motor 36 to the region therebelow. Air heated by motor 36 is circulated and directed along the inner surface of casing 42 and is returned through bores 178 in armature 74. Blade 186 is not of such a pitch that it would produce high air pressures which would, in turn, cause an internal load on motor 36.

Having thus described the invention, what is claimed as new and desired to be secured by Letters Patent is:

1. In a waste disposer:
    a shredder ring;
    a rotor;
    means mounting said rotor in substantially axial alignment with said ring for rotation with respect thereto;
    means coupled with said rotor for rotating the same in opposed directions;
    a projection;
    means mounting said projection on said rotor for rotation with respect to the latter and for movement relative to said ring into and out of a position in waste-shredding relationship thereto;
    means carried by said rotor and engageable with said projection for rotating the latter with said rotor; and
    cam means rotatable with said rotor and having a surface engageable with said projection for normally maintaining said projection in said position as it rotates with said rotor in one direction and, said cam means having a recess movable into alignment with said projection to permit said projection to move out of said position after it has been rendered immovable relative to said ring by an object wedged between said projection and said ring and after said rotor has been rotated in the opposite direction relative to said projection.

2. In a waste disposer as set forth in claim 1, wherein said maintaining means includes a disc axially aligned with and rigid to said rotor, said disc having an outer peripheral surface provided with a recess therein, said peripheral surface of said disc being engageable with said projection to releasably hold the same in said position when said projection rotates with said rotor, said disc being rotatable with said rotor in said opposite direction until said recess is aligned with said projection to thereby permit the latter to move out of said position when an object is wedged between said ring and said projection.

3. In a waste disposer as set forth in claim 1, wherein said projection mounting means includes a plate shiftably mounted on said rotor, said projection being mounted on said plate for movement in opposed directions transversely of the outer periphery of the rotor.

4. In a waste disposer as set forth in claim 3, wherein said plate is provided with a radial slot therein, said projection being within said slot and being shiftable between the ends thereof.

5. In a waste disposer as set forth in claim 4, wherein said plate is provided with an upper face and a lower face, said projection including a lug extending through said slot and projecting upwardly from said upper face, and a retainer coupled with said lug for holding the same in said slot.

6. In a waste disposer as set forth in claim 5, wherein said lug is provided with a pair of spaced grooves, said retainer including a pair of spaced sides receivable within said grooves of the lugs and disposed in juxtaposition to said lower face of the plate.

7. In a waste disposer as set forth in claim 5, wherein said maintaining means includes a surface and a recess, said surface being movable between the retainer and axis of said rotor and being engageable with said retainer to urge said lug outwardly of said axis and into relatively close proximity to said ring, whereby said projection is releasably maintained in said position, said recess being movable into alignment with said retainer as said surface moves out of engagement therewith in response to the rotation of said rotor in said opposite direction relative to said projection, said retainer being movable into said recess and away from said ring when said recess is aligned with said retainer and when an object is wedged between said ring and said lug, whereby the wedging action of said object will be relieved.

8. In a waster disperser as set forth in claim 3, wherein said rotor is provided with a disc thereon having a recess in the outer peripheral surface thereof, said disc defining said maintaining means, said plate being disposed on said disc in sliding engagement therewith, and wherein is included means releasably holding said plate in sliding engagement with said disc.

9. In a waste disposer:
a shredder ring;
a rotor having an upper surface;
means mounting said rotor for rotation with respect to said ring with said rotor substantially axially aligned therewith;
means coupled with said rotor for rotating the same in opposed directions;
a disc rigid to said upper surface of said rotor and provided with a pair of substantially diametrically opposed peripheral surface segments and a peripheral recess for each segment respectively;
a plate supported on said disc and being shiftable relative thereto, whereby said rotor may rotate relative to said plate, the latter having a pair of substantially diametrically opposed, radial slots therein;
means coupled with said rotor for releasably retaining said plate on said disc;
a lug for each of said slots respectively, the lugs extending through respective slots and projecting upwardly from said plate, each lug being movable within and along the corresponding slot into and out of a position in waste-shredding relationship to said ring;
a retainer for each lug respectively, each retainer being disposed below said plate and releasably coupled with the respective lug to hold the latter in said slot, each retainer having a convex outer edge, said segments of said disc being movable into engagement with the outer edges of respective retainers to urge the corresponding lugs into said positions thereof as said rotor rotates relative to said plate in one direction; and
means on said rotor and engageable with one of said retainers for rotating said plate and thereby said lugs after the latter have been urged into said positions thereof by the interengagement of said outer edges of the retainers and said surface segments, each of said recesses being movable into alignment with and being disposed to receive a portion of the adjacent retainer when the wedging action of an object wedged between said ring and the lug of the last-mentioned retainer renders the lug and thereby said plate immovable and urges the retainer away from said ring after the rotor has been rotated in the opposite direction to move the corresponding surface segment out of engagement with the outer edge of the last-mentioned retainer, whereby said wedging action is relieved and said lug and thereby said plate is again rotatable with said rotor.

10. In a waste disposer as set forth in claim 9, wherein said surface segments are movable into engagement with said outer edges of adjacent retainers when said rotor is rotated in said opposite direction, whereby said lugs are moved into said positions thereof, said plate rotating means being disposed to rotate said plate and thereby said lugs after the latter have moved into said positions and as said rotor continues to rotate in said opposite direction.

11. In a waste disposer as set forth in claim 9, wherein each lug is provided with a pair of opposed, substantially flat side faces disposed transversely of the path of rotation of said rotor and a pair of spaced end edges at the outer extremities of respective side faces, said end edges extending upwardly from said plate and being in a waste-shredding disposition with respect to the inner surface of said ring.

12. In a waste disposer:
an elongated, tubular housing having top and bottom openings and a drain conduit in the housing above said bottom opening;
a rotor and motor assembly movable through said bottom opening and into an operative position within said housing;
quick-release means between said housing and said assembly securing said assembly in said position, said quick-release means being below said conduit to permit removal of the assembly without interfering with said conduit; and
a casing enclosing said motor, disposed within and spaced from said housing and provided with an annular flange spanning the distance between said casing and said housing, whereby said casing and said housing define a waste-receiving passage when said assembly is in said position.

13. In a waste disposer as set forth in claim 12 wherein said housing has a bottom face surrounding said opening, and wherein is included a support for said rotor, said support being engageable with said bottom face as said assembly moves into said position, said quick release means including a number of spaced fasteners interconnecting said support and said housing.

14. A waste disposer comprising:
a housing having an open top and an open bottom;
an inlet conduit above said housing and aligned with said open top thereof, said conduit having an annular, laterally extending flange at its lower extremity;

structure securing the same to said housing adjacent said open top thereof and having a portion overlying and engaging said flange, whereby said housing is suspended from said discharge conduit;

a shredder ring within said housing;

a casing extending into said housing through the open bottom thereof and being disposed below said ring, said casing being spaced inwardly from said housing and having an annular, laterally extending flange spanning the distance between said casing and said housing, whereby said housing and said casing define an annular waste-receiving passage below said ring;

quick-release means securing said flange to said housing adjacent to said open bottom thereof, said casing having a central recess therein;

a motor mounted within said recess of said casing and disposed in thermal interchange relationship therewith, whereby the waste received within said passage will cool said motor when the latter is heated during its operation;

a rotor on said casing within said housing and in substantially axial alignment with said ring, there being a space permitting waste to pass from the region above said rotor into said passage, said rotor being coupled with said motor for rotation thereby when the motor is actuated, said housing having a discharge outlet communicating with said passage and provided with surface means directing waste into said outlet when said waste is moving through said passage in either of a pair of opposed directions;

a pair of projections;

means mounting said projections in diametrically disposed locations on said rotor for rotation with respect thereto and for movement relative to said ring into and out of positions in waste-shredding relationship to the ring;

means carried by said rotor and movable into coupled relationship with said projections for rotating the latter with said rotor; and means normally maintaining said projections in said positions as they rotate with said rotor in one direction and permitting either of said projections to move out of said position thereof after either of said projections has been rendered immovable relative to said ring by an object wedged between the immovable projection and said ring and after said rotor has rotated in the opposite direction relative to said projections.

15. A waste disposer as set forth in claim 14 wherein is provided means within said casing for circulating air therethrough whereby to minimize condensation in said recess.

16. A waste disposer as set forth in claim 15, wherein said motor is provided with an armature having a number of bores extending therethrough longitudinally of the axis of rotation thereof, and a core having a flattened side defining a fluid passage between the motor and the inner surface of the casing, said circulating means including a fan blade secured to the armature for rotation therewith to cause air to circulate through the bores and passage.

17. In a waste disposer having a rotor:

an elongated, tubular, nonmagnetic structure comprised of spaced sidewalls defining a waste-receiving passage; and a motor operably coupled with said rotor for rotating the latter, one wall of said structure being disposed in circumscribing, thermal interchange relationship with said motor and extending in at least partial surrounding relationship to the latter, whereby the waste received within said passage will cool said motor when the latter is heated during its operation, said one wall of the structure defining a recess in the structure and said passage being in surrounding relationship to said recess, said motor being disposed within said recess and provided with a core of heat-conducting material in contact with the portion of said structure defining said recess.

References Cited

UNITED STATES PATENTS

| | | | |
|---|---|---|---|
| 2,577,152 | 12/1951 | Powers | 241—257 |
| 2,682,376 | 6/1954 | Frank | 241—257 |
| 2,730,308 | 1/1956 | Jordan. | |
| 2,772,836 | 12/1956 | Gebhart | 241—299 |
| 2,870,970 | 1/1959 | Williamson | 241—260 |
| 2,939,639 | 6/1960 | Coss | 241—46.1 X |
| 2,950,868 | 7/1960 | Lannert | 241—46.1 |
| 3,083,922 | 4/1963 | Enright | 241—257 |
| 3,113,735 | 12/1963 | Clements. | |
| 3,165,270 | 1/1965 | Stout et al. | |

ANDREW R. JUHASZ, *Primary Examiner.*

U.S. Cl. X.R.

241—100.5, 36